Feb. 21, 1956 E. GREENE 2,736,004
DASH TIRE-PRESSURE INSTRUMENTS FOR VEHICLES
Filed July 18, 1951 3 Sheets-Sheet 1
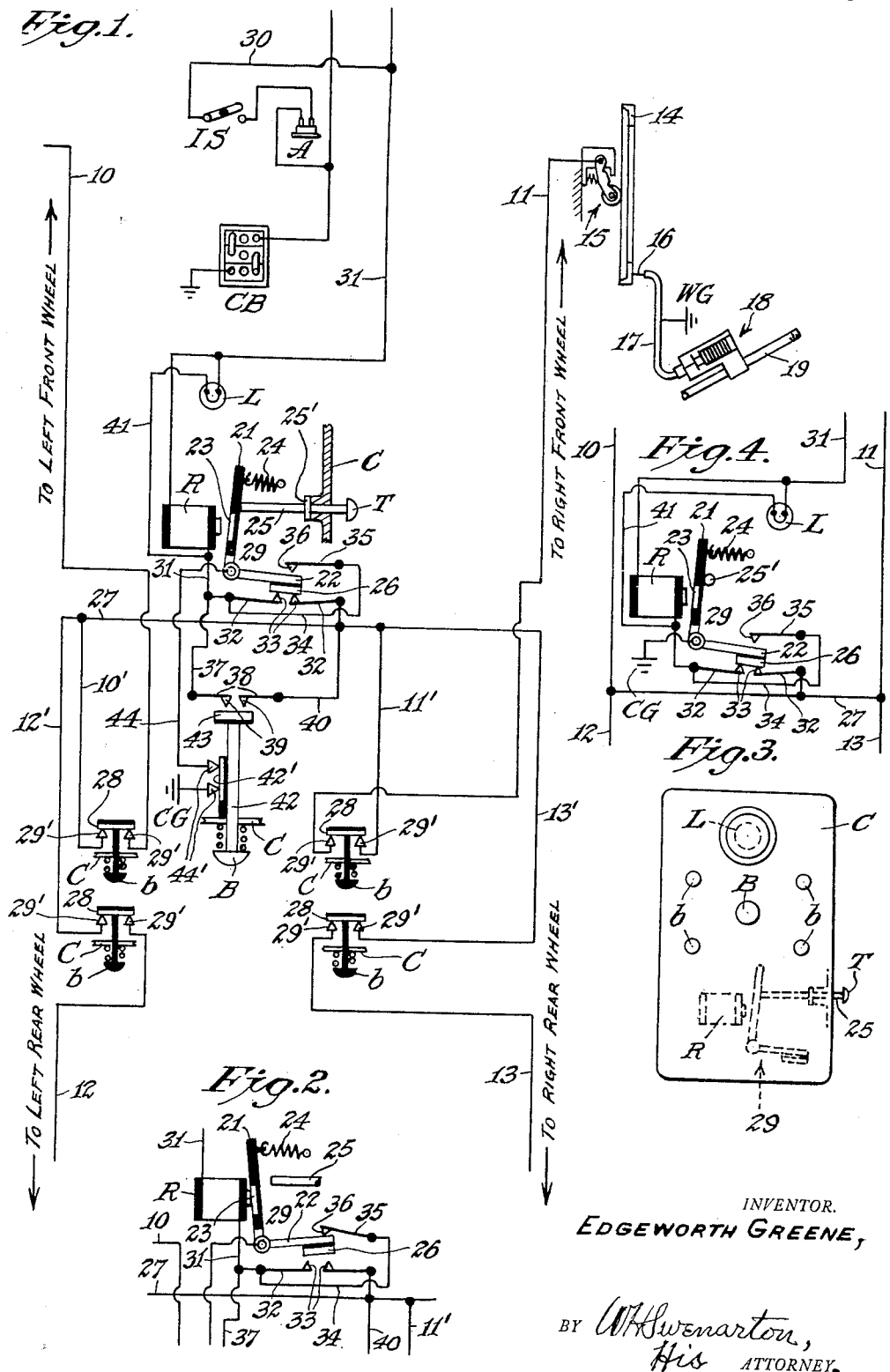
INVENTOR.
EDGEWORTH GREENE,
BY W. H. Swenarton,
His ATTORNEY.

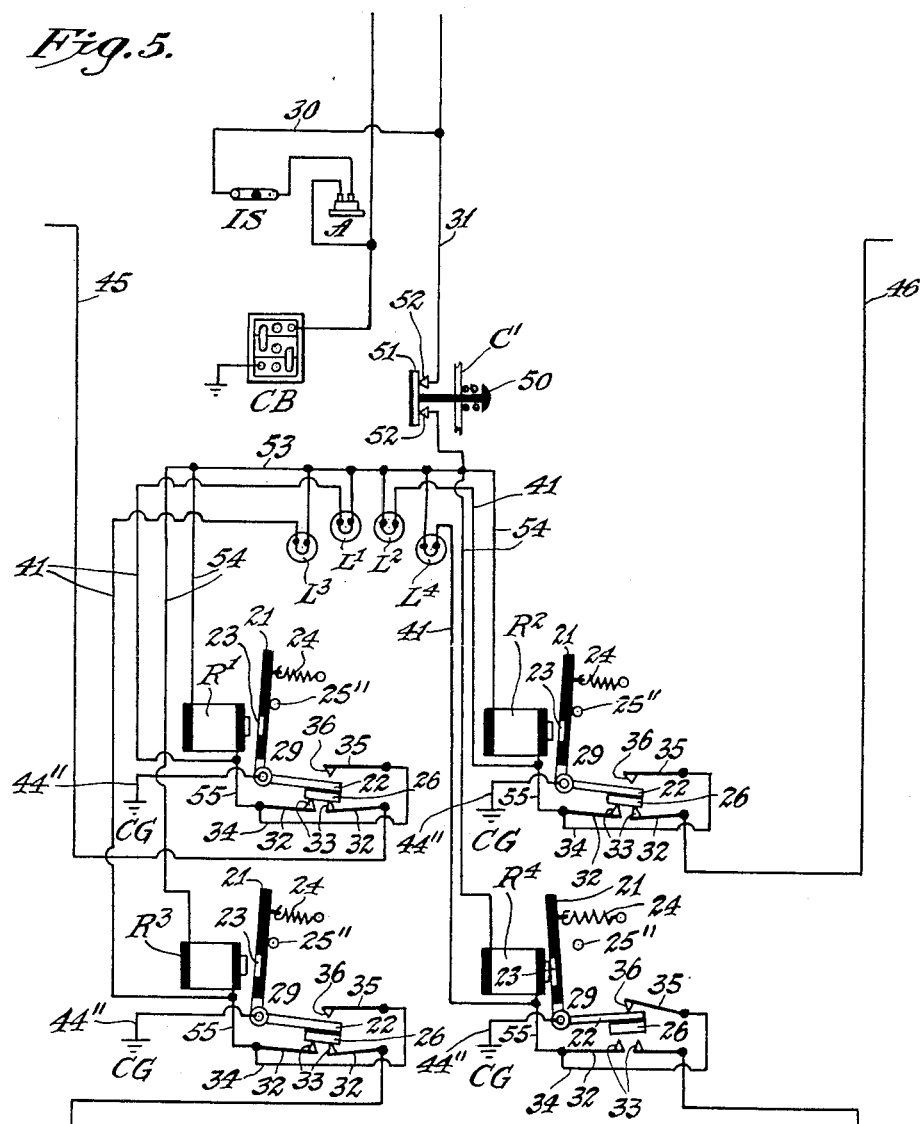
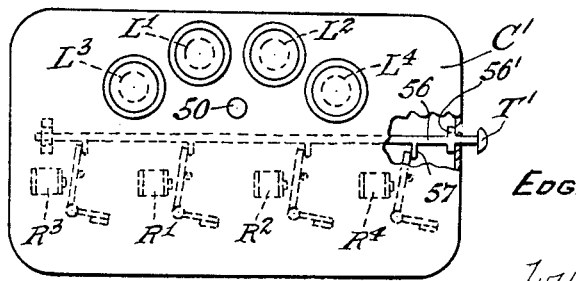

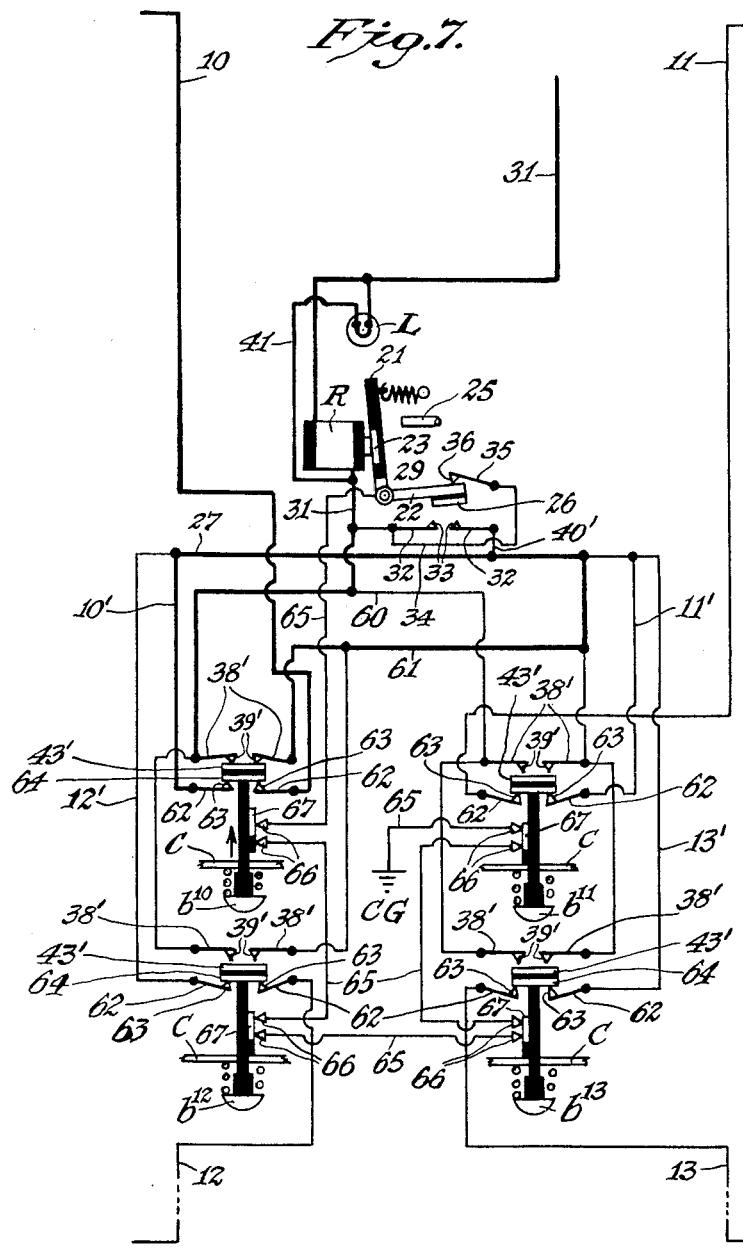

United States Patent Office 2,736,004
Patented Feb. 21, 1956

2,736,004

DASH TIRE-PRESSURE INSTRUMENTS FOR VEHICLES

Edgeworth Greene, Little Falls, N. J.

Application July 18, 1951, Serial No. 237,330

2 Claims. (Cl. 340—58)

This invention relates to the protection of the pneumatic tires of a vehicle in order to effectively prevent undue deflation thereof and possible resulting blow-outs, whereby not only is the safety of the occupants of the vehicle insured but the life of the tires, due to the fact that an optimum pressure can be maintained therein at all times except possibly under the most unusual circumstances, can be materially prolonged.

The principal object of the invention is the provision of means for immediately and automatically transforming a closed wheel-grounded circuit, which includes a dash tire-pressure gauge, into a circuit grounded on and confined exclusively to the chassis whereby any tendency for the car bearings to be damaged by the prolonged flow of electric current from the car battery therethrough is entirely prevented. Other objects of the invention are—

(1) The accomplishment of such change of circuit with but a single relay responsive to any one or all of the tires of a vehicle.

(2) The provision of means for determining, without leaving the vehicle or stopping the motor, which tire is deflated.

(3) The provision of automatic means for resetting the relay to be again responsive to tire air losses. (Ignition switch).

(4) The provision of means for testing the signal lamp through the relay and chassis grounded connection.

My invention is fully set forth in the following detailed description and drawings forming a part thereof, in which Fig. 1 is an electric circuit diagram or hook-up illustrating a preferred form of the invention, and showing a relay in its normal position ready to be operated by a circuit closed and grounded on a wheel;

Fig. 2 is a fragmentary detail view of part of the circuit of Fig. 1, but with the relay shown energized for shifting the circuit to a grounded connection on the chassis;

Fig. 3 is a front elevation, on a reduced scale, showing a housing for the various circuit controls, both manual and automatic, shown in Fig. 1.

Fig. 4 shows a modified circuit illustrating the simplest form of the invention;

Fig. 5 shows another modified circuit in which there are separate signal lamps and relays for each wheel;

Fig. 6 is a front elevation of a housing, partly broken away, for mounting and enclosing the relays, signal lamps, and manually operated equipment shown in Fig. 5; and Fig. 7 is a diagram of a modified form of hook-up.

The basic principle disclosed in the circuits, is the provision of means for automatically selecting a grounded connection on the chassis of the vehicle instead of the one first utilized, of necessity, on the wheel. To do this dependably the relay for operating a switch is kept energized during the change of ground location by making the chassis-grounded contacts before leaving the wheel-grounded contacts, and thereby arcing is avoided.

Referring to the drawings, numerals 10, 11, 12 and 13 are wire conductors leading respectively to the left front vehicle wheel, the right front wheel, the left rear wheel (or group of wheels) and the right rear wheel (or group of wheels). 10' is the wire connecting the left contact of push-button switch $b$ to wire 27 that is common to all of the wheel wires 10, 11, 12 and 13. Similar wires 11', 12' and 13' connect wheel wire 11, 12 and 13 to wire 27.

A contact ring 14 is mounted on the inside of the brake drum of each wheel and rotates therewith. 15 is the roller bearing contact unit for a ring 14 and is mounted on the brake-supporting plate. 16 is a wire connecting ring 14 to the tire stem switch and its armored cover is grounded to its wheel and to the housing of the electro-pneumatic valve stem switch 18. The latter is mounted on the valve stem 19. Numeral 21 designates the armature arm of a bell-crank lever 29 for a relay R and 22 the other arm of 29 with bridging contact. 23 is the armature on 21, and 24 the bell-crank spring. The shank on test button T also serves as a stop for said bell-crank. 26 is the bridging contact aforesaid on arm 22. The wire 27 forms a common connection between the minus terminal of the car battery CB and all wheel wires through relay R. 28 is the bridging contact on the stem of each push-button $b$, and 29' the contacts bridged by 28. A wire 30 leads from minus side of battery through ignition switch IS and ammeter A to the wire 31 leading to relay R. Spring contact arms 32 have contacts 33 which normally engage the bridging contact 26 of arm 22. A shunt wire 34 connects the left arm 32, around the other arm 32, to spring contact arm 35 which has a terminal contact element 36. A wire 37 leads to the left spring contact arm 38 of a pair of arms having contact 39 that are used to close the secondary shunt circuit manually. 40 is the secondary shunt wire connecting the right arm 38 to the right arm 32. A wire 41 connects a signal lamp L in parallel with the relay R. The reference letter C designates the casings of push buttons $b$ that are used for locating a grounded wheel circuit closed for lack of air pressure in a tire. B is a central master push button that is used with $b$ as hereinafter explained to find which tire has lost air and also to restore (re-set) the relay R after the tire is re-inflated provided the ignition switch has not been turned off. The reference letter WG designates the wheel ground.

In Fig. 5, the numerals 45, 46, 47 and 48, designate wires connecting the respective wheels, each to a different one of the relays R', R², R³ and R⁴ (one relay for each of the wheels 45, 46, 47 and 48 or group of wheels on one end of an axle). 50 is the re-setting button switch of a relay which is used to automatically re-set the relay when the ignition switch is not turned off, i. e. is closed. 51 is the bridging contact on the stem of button 50, and 52 the contact elements bridged by 51. A wire 53 forms a common connection with the minus side of the battery and all wheel wires, through relays R', R², R³ and R⁴. The wires 54 connect said relays to the wire 53, and wires 55 connect said relays to the left contact arm 32. A bar 56 (Fig. 6) having a stop shoulder 56' and actuating lugs 57 serves to simultaneously manually operate bell cranks 29 when it is desired to manually test all the signal lamps at once.

Referring to Fig. 4 of the drawings, wires 10, 11, 12 and 13 are respectively connected to the wheels of a vehicle, the same being illustrated as leading to the corresponding positions of the individual front and rear wheels. One of these connections is shown in Fig. 1 to be through a roller 15 yieldably mounted on and insulated from each fixed brake support plate. Roller 15 electrically contacts an insulated metallic contact ring 14 mounted on the inner surface of each brake drum to rotate therewith. Ring 14 is connected by wire 16 to an electro-pneumatic switch 18 operatively mounted on tire valve stem 19. Wire 16 is an armored cable, the metallic armor 17 being utilized as a ground connection by positively contacting the metal of a wheel, the same constituting a part of the subject matter of my co-pending application filed April 14, 1947, Ser. No. 741,291.

On referring to Fig. 1 of the drawings, it will be seen that wire 31 is connected through the ammeter A and ignition switch IS to the minus side of the car battery CB. The plus side of the battery is grounded as usual on the car chassis. Battery lead wire 31 of Fig. 4 is connected through the coil of a single relay R to spring arm 32 having a contact 33. A pivoted bell crank lever 29 has arms 21 and 22, the former carrying an insulated armature 23 and being attached to a pull spring 24 which urges it away from the relay when the latter is de-energized. A stop 25' serves to limit the movement of arm 21 by the action of the spring 24. Arm 22 of lever 29 is provided with an insulated contact 26 which normally bridges a pair of spaced contacts 33 respectively mounted on opposed spring arms 32. One of these arms is connected to wire 31, and the other to a cross-chassis wire 27 connected in common to all wheel wires 10 to 13.

A signal lamp L is connected in parallel with relay R so that when the latter is energized, as the result of a deflated tire, the lamp will light and indicate that a tire on the vehicle is underinflated. Upon the energizing of relay R, the bellcrank lever 29 will assume the position shown in Fig. 2 thereby expanding the normally contracted spring 24. This occurs when switch 18 closes and current flows from grounded side of battery through the car chassis and the wheel bearings to the metal of a wheel body, and through the armor 17 of wire 16 (Fig. 1). The armor is grounded on the switch casing as well as on the body of the wheel and to which casing there is grounded a movable switch-contact member consisting of a metal bellows, and all of which is insulated from wire 16 leading from a stationary switch-contact member to ring 14, and thence through roller 15 to wire 11. Since wire 11 is connected to wire 27, current will pass through arms 32 and their contacts 33 by crossing bridging contact 26, and thence through relay R and lamp wire 41 to lead wire 31, wire 30, ignition switch IS (if closed), ammeter A, and to the opposite or minus side of battery CB, thus completing the circuit. However, the instant relay R is energized, lever 29 moves to the position of Fig. 2 and contact 26 breaks away from the contacts 33, but not before arm 22 picks up contact 36 of spring arm 35, connected through shunt wire 34 to wire 31 beyond relay R. Arm 22 is grounded (Figs. 4) to the car chassis at CG. Thus the circuit through the relay and lamp will not be interrupted during this change from a ground located on the wheel to one located on the chassis. Current now coming from the battery through its grounded connection to the chassis will reach arm 22 through a wire grounded at CG to the chassis remote from any wheel, and thence through contact 36, spring arm 35 and shunt wire 34, thus keeping the relay and lamp in circuit, and through wire 31 to the minus side of the battery. Should the ignition switch then be opened, the relay will be cut off and lever 29 will automatically return to the position of Fig. 1. Should the ignition switch be closed again, the relay will again move lever 29 to the position of Fig. 2. However, in the meantime, if the tire at fault has been inflated, the relay will not be energized during such closing of the ignition switch, and the lamp will not be lighted until such time as a subsequent loss of tire pressure occurs and the relay is operated again in the manner above described.

Fig. 5 shows an example of the wiring in Fig. 4 when a relay is employed for each wheel with corresponding lamps L', L², L³ and L⁴. With this arrangement the particular wheel whose tire is underinflated is indicated, and is shown in the drawings to be the right rear wheel connected through relay R⁴ to lamp L⁴ because of their relative position as shown in Fig. 6, with respect to that of the several wheels of the vehicle.

When relay R is actuated, following the loss of pressure in a tire, the bellcrank lever 29 (Fig. 1) assumes the position shown in Fig. 2 with the signal lamp circuit grounded through the car ground CG, because the shunt wire 34, around the wheel-ground contacts 33, is then part of a live circuit grounded across contacts 44' through wire 44. Should the ignition switch IS be opened, this circuit will also be opened and spring 24 will restore bellcrank lever 29 to its re-set position in which the wheel-ground contacts 33 are again closed. Should the ignition switch be closed again, the grounded connection WG will again automatically operate the relay, and bellcrank lever 29 will again move into a position in which the circuit is grounded on the car chassis. However, if the tire at fault has in the meantime been inflated, then switch 18 will be open and the relay will not be energized through the WG connection, and bellcrank lever 29 will remain in the position shown in Fig. 1 until such time as one or more of the wheel switches closes and grounds one or more of the wheel wires 10 to 13. The operation is then repeated transferring the "wheel" circuit to the "car" circuit.

To ascertain which tire is deflated following a signal lamp L indication, the driver simply pushes center or master button B, and then, while still keeping the same depressed, pushes each one of the surrounding associated buttons b shown on dash instrument of Fig. 3, which are relatively so positioned as to correspond to the several wheels of the vehicle. The particular button b which when depressed puts out the signal lamp L, will be the tire whose valve stem switch is closed by a drop in air pressure. Button B when depressed to find which tire has illuminated the signal lamp, cuts off the car ground CG connection when one of the contacts 44' rides off of bridge contact 42'. This occurs after a shunt circuit is set up by contact 43 bridging contacts 38 without allowing the bellcrank lever 29 to leave its position shown in Fig. 2. Thus the signal circuit will be manually shifted, momentarily, to the wheel ground instead of the car ground. Since therefore as one of the wheel wires 10 to 13, grounded by its corresponding valve stem, is keeping the relay alive and the lamp lit, when the corresponding button b is depressed the circuit will be broken through a particular wheel wire and the lamp will go out and the bellcrank 29 will return to Fig. 1 position. If all the buttons B and b are then released with the tire still deflated, the relay will again be energized and the bellcrank 29 will return to Fig. 2 position and the lamp illuminated again, but this time through the car grounded connection.

To test lamp L at any time, one simply depresses button T which manually shifts the lamp and relay circuit to car ground. To restore relay, one presses button B which breaks car ground, and since no wheel circuit is presumably closed, the lamp will not light again or the relay be energized.

Figs. 5 and 6 illustrate a hook-up which operate similarly with respect to the selection of a car-grounded connection in place of an initial wheel-grounded connection. In this example of the invention there is a relay and lamp provided for each wheel which are connected in parallel. Button T¹ (Fig. 6) is used for testing all lamps simultaneously. Either button 50 (Figs. 5 and 6) or the ignition switch serves to reset all relays if the tire at fault has been re-inflated, otherwise, if the tire has not been re-inflated, a then wheel-grounded lamp again lights when button 50 is released or the ignition switch is again closed.

Referring to the hook-up shown in Fig. 7, the means for determining which tire needs inflating includes the use of four buttons $b^{10}$, $b^{11}$, $b^{12}$ and $b^{13}$ corresponding in general to the buttons b of Fig. 1, but each now adapted to function in a manner that includes the characteristic of button B and so that the latter may be omitted to simplify and cheapen electrical equipment for this purpose.

With this object in view each button is provided with a bridging contact 43', corresponding functionally to contact 43 of Fig. 1, and for the similar purpose of keeping the relay R energized while manually changing the car-grounded signal circuit to a wheel-grounded one. The relay R in Fig. 7 is shown as having been energized by the closing of the tire valve stem switch that is connected to the wire 10, and with the bellcrank 29 in its associated position, the current having followed the usual initial course, as in Fig. 1, through and across contacts 33, with the immediate change from wheel-ground to car-ground by current flowing over shunt wire 34, to contact 36, and arm 22. However, in this instance, the circuit then differs, and the car-ground is reached instead through wire 65 having a pair of contacts 66 for each of the buttons which are connected in series to the car-ground indicated at CG. By this series arrangement of the contacts 66 the car-ground connection will be broken should any one of the buttons be depressed, as shown to be the case with respect to button $b^{10}$. In this hook-up, it is assumed that button $b^{10}$ has been depressed just short of all the way, having thereby temporarily re-established the wheel-ground before the car-ground was broken at contacts 66, and therefore without de-energizing the relay. Current will thereupon flow across contacts 39' over wire 61, wire 27, wire 10', across contacts 63 to wire 10 whose associated tire stem switch is closed and therefore grounded on the left front wheel.

Now, since the button $b^{10}$ is depressed all the way, bridging contact 64 will leave contacts 63 upon further deflection of spring arms 38'. This final movement of button $b^{10}$, will cut off the wheel-ground, and there being no car-grounded connection available or other wheel-ground, the lamp L will be extinguished for want of current, indicating that the tire of this particular wheel is underinflated. It will be understood that the intermediate position of button $b^{10}$ is shown for explanation purposes, and that in normal practice the button is pushed into a fully depressed position until its shoulder, which functions as a stop, impinges the casing. The springs surrounding the shanks of said buttons insure a return of the several buttons to a fully retracted position in which the insulated bridging contacts 67 are again in a bridging position with respect to contacts 66.

It will be noted that if any of the other buttons $b^{11}$, $b^{12}$ and $b^{13}$ are depressed after releasing button $b^{10}$, the lamp L will continue to glow because the respective valve stem switches of the other three wheels will be open under the influence of ample tire pressure, and therefore the breaking of their respective wheel-grounded contacts 63 will have no effect as current will still reach a wheel-ground through the switch-grounded wheel of wire 10, the relay in this instance having been kept alive by bridging a pair of contacts 39' corresponding to whichever one of the other buttons that has been depressed but before the car-grounded connection across contacts 66 via contacts 67, is broken by that particular button.

The term "electric relay" as used herein is intended to include known equivalents such as solenoids operating with sliding contacts for controlling the aforesaid electric circuits without the employment of spring arms such as illustrated in the drawings. Furthermore, the term "tire switch" is used in a generic sense to include known equivalents of built-in valve stem switches and switches associated with the valve stem, such for example as switches which extend inwardly from the wheel rim in such a manner as to be directly responsive to air pressure within the tire.

Having thus described the invention, I claim:

1. In an electric protection system for the pneumatic tires of vehicles, the combination with a vehicle chassis having a plurality of wheels equipped with pneumatic tires, of an electro-pneumatic switch associated with each tire and responsive to the pressure prevailing therein, a normally open wheel circuit for each tire switch which includes a storage battery carried by said chassis and the switch associated with the tire as elements thereof, an associated, normally open chassis circuit which also includes said storage battery and also includes an electric signal as elements thereof, each wheel circuit having one of its terminals permanently grounded to the chassis via the wheel axle and having its other terminal grounded to the chassis via the said storage battery, a master relay serving to first establish a flow of current in said chassis circuit and to then open a circuit in a wheel circuit that has been established by the closing of its tire switch to thereby confine the flow of current exclusively to the chassis circuit and prevent any tendency for the vehicle bearings to become damaged by prolonged flow of current therethrough and means for maintaining such relay energized during such operation.

2. In an electric protection system for the pneumatic tires of vehicles, the combination with a vehicle chassis having a plurality of wheels equipped with pneumatic tires, of an electro-pneumatic switch associated with each tire and responsive to the pressure prevailing therein, a normally open wheel circuit for each tire switch which includes a storage battery carried by said chassis and the switch associated with the tire as elements thereof, an associated, normally open chassis circuit which also includes said storage battery and also includes an electric signal as elements thereof, each wheel circuit having one of its terminals permanently grounded to the chassis via the wheel axle and having its other terminal grounded to the chassis via said storage battery, a master relay serving to first establish a flow of current in said chassis circuit and to then open a circuit in a wheel circuit that has been established by the closing of its tire switch to thereby confine the flow of current exclusively to the chassis circuit and prevent any tendency for the vehicle bearings to become damaged by prolonged flow of current therethrough, means for maintaining such relay energized during such operation and manually operated means for re-setting the said master relay.

References Cited in the file of this patent

UNITED STATES PATENTS

| | | |
|---|---|---|
| 1,305,315 | Stohl | June 3, 1919 |
| 1,703,734 | Henry | Feb. 26, 1929 |
| 2,135,303 | Greene | Nov. 1, 1938 |
| 2,278,939 | Muehter | Apr. 7, 1942 |
| 2,493,548 | Proctor | Jan. 3, 1950 |
| 2,621,240 | Kemper | Dec. 9, 1952 |